United States Patent
Zhao et al.

(10) Patent No.: US 9,430,302 B2
(45) Date of Patent: Aug. 30, 2016

(54) METHOD, DEVICE AND SYSTEM FOR USING AND INVOKING OAUTH API

(71) Applicant: Huawei Technologies Co., Ltd., Shenzhen, Guangdong (CN)

(72) Inventors: Qingwei Zhao, Shenzhen (CN); Wenhua Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/335,518

(22) Filed: Jul. 18, 2014

(65) Prior Publication Data

US 2014/0331240 A1    Nov. 6, 2014

Related U.S. Application Data

(63) Continuation of application No. PCT/CN2013/070753, filed on Jan. 21, 2013.

(30) Foreign Application Priority Data

Jan. 20, 2012   (CN) .......................... 2012 1 0018877

(51) Int. Cl.
*G06F 3/00* (2006.01)
*G06F 9/44* (2006.01)
(Continued)

(52) U.S. Cl.
CPC ............... *G06F 9/541* (2013.01); *H04L 63/08* (2013.01)

(58) Field of Classification Search
None
See application file for complete search history.

(56) References Cited

U.S. PATENT DOCUMENTS 7,945,774 B2   5/2011   Ganesan
7,966,652 B2   6/2011   Ganesan
(Continued)

FOREIGN PATENT DOCUMENTS

CN   1608248 A   4/2005
CN   1633641 A   6/2005
(Continued)

OTHER PUBLICATIONS

Faynberg et al., "On Dynamic Access Control in Web 2.0 and Beyond: Trends and Technologies," Bell Labs Technical Journal, vol. 16, No. 2, pp. 199-218, Wiley Online Journal, Hoboken, New Jersey (Sep. 2011).

(Continued)

*Primary Examiner* — Hyung S Sough
*Assistant Examiner* — William C Wood
(74) *Attorney, Agent, or Firm* — Leydig, Voit & Mayer, Ltd

(57) ABSTRACT

The present invention provides methods, devices and systems for using and invoking an Oauth API. The method includes: receiving registration information for registering an Oauth API; generating an Oauth API invoking associated interface according to the registration information, and binding it with the registered Oauth API, to generate binding information; receiving an increasing Oauth API message and responding, generating a client requesting Oauth API interface, an Oauth API returned information processing interface and a client customer serial number managing interface, which correspond to the registered Oauth API; receiving a publishing application message, responding to the publishing application message, and generating a deployment package which includes the client requesting Oauth API interface, the Oauth API returned information processing interface and the client customer serial number managing interface; sending the binding information and the deployment package to an application running engine, based on which the application running engine complete Oauth API scheduling.

8 Claims, 8 Drawing Sheets

(51) Int. Cl.
  *G06F 9/46* (2006.01)
  *G06F 13/00* (2006.01)
  *G06F 9/54* (2006.01)
  *H04L 29/06* (2006.01)

(56) References Cited

U.S. PATENT DOCUMENTS

| | | | |
|---|---|---|---|
| 2003/0135628 | A1 | 7/2003 | Fletcher et al. |
| 2003/0181193 | A1 | 9/2003 | Wilhelmsson et al. |
| 2004/0225878 | A1* | 11/2004 | Costa-Requena et al. ... 713/150 |
| 2004/0243821 | A1* | 12/2004 | Kim et al. ............ 713/200 |
| 2007/0250906 | A1* | 10/2007 | Hattori .................. 726/2 |
| 2008/0196084 | A1* | 8/2008 | Hawkes .......... G06F 17/30899 726/2 |
| 2012/0266229 | A1* | 10/2012 | Simone .............. G06F 21/41 726/9 |
| 2013/0007846 | A1* | 1/2013 | Murakami et al. ........... 726/4 |
| 2013/0236000 | A1 | 9/2013 | Qiu et al. |

FOREIGN PATENT DOCUMENTS

| | | |
|---|---|---|
| CN | 101383845 A | 3/2009 |
| CN | 101500344 A | 8/2009 |
| CN | 101562621 A | 10/2009 |
| CN | 101969469 A | 2/2011 |

OTHER PUBLICATIONS

Hammer-Lahav, "The OAuth 1.0 Protocol," Internet Engineering Task Force, Request for Comments: 5849, pp. 1-38, Internet Society, Reston, Virginia (Apr. 2010).

Basney et al., "An OAuth Service for Issuing Certificates to Science Gateways for TeraGrid Users," TeraGrid'11, Salt Lake City, Utah (Jul. 18-21, 2011).

Tschofenig et al., "Browser Support for the Open Authorization (OAuth) Protocol," W3C Workshop on Identity in the Browser, Mountain View, California (May 24-25, 2011).

* cited by examiner

METHOD, DEVICE AND SYSTEM FOR USING AND INVOKING OAUTH API

CROSS-REFERENCE TO RELATED APPLICATIONS

This application is a continuation of International Patent Application No. PCT/CN2013/070753, filed on Jan. 21, 2013, which claims priority to Chinese Patent Application No. 201210018877.4, filed on Jan. 20, 2012, both of which are hereby incorporated by reference in their entireties.

TECHNICAL FIELD

The present invention relates to authorization access technologies and, in particular, to a method, a device and a system for using and invoking an Oauth API, which belong to the field of communication technology.

BACKGROUND

An open authorization protocol (An open protocol to allow secure API authorization in a simple and standard method from desktop and web applications, Oauth) has been widely used on the Internet as a third-party API authentication and authorization access protocol which is currently most popular in the industry, this standard can enable a user to expose private information which is saved at a certain service provider to third-party applications without exposing the user key, for example, Google, Sina, Tencent and others publish abundant APIs based on the Oauth standard. A trust mechanism of different services is established through the Oauth protocol, which greatly promotes the Internet's opening.

Although the purpose of protecting access resources can be achieved currently by providing APIs under the Oauth protocol by the service providers, for developers using open authorization application programming interface (Oauth Application Programming Interface, Oauth API), the Oauth API can only be used by way of writing code. For example, the work of integrating the Oauth API is completed through citing software development kit (Software Development Kit, SDK) provided by an Oauth API provider (Provider), invoking a authentication interface and a service interface in the SDK by writing code, and tightly coupling Oauth authorization logic into application code. The developers use the Oauth API by way of writing code, such a method for using the Oauth API is complicated and inefficient, thereby exposing the problem of how to use the Oauth API efficiently.

SUMMARY

For the deficiencies in the prior art, the present invention provides a method, device and system for using and invoking an Oauth API, so as to use the Oauth API efficiently.

One aspect of the present invention provides a method for using an Oauth API, the method includes:

receiving registration information for registering an Oauth API;

generating an Oauth API invoking associated interface according to the registration information;

binding the Oauth API invoking associated interface with the registered Oauth API, and generating binding information;

receiving an increasing Oauth API message, responding to the increasing Oauth API message, and generating a client requesting Oauth API interface, an Oauth API returned information processing interface and a client customer serial number managing interface, which correspond to the registered Oauth API;

receiving a publishing application message, responding to the publishing application message, and generating a deployment package which includes the client requesting Oauth API interface, the Oauth API return information processing interface and the client customer serial number managing interface;

sending the binding information and the deployment package to an application running engine, so that the application running engine complete Oauth API scheduling according to the binding information and the deployment package.

Another aspect of the present invention also provides an application developing platform, the application developing platform includes:

an Oauth API registration module, configured to receive registration information for registering an Oauth API;

an invoking associated interface generating module, configured to generate an Oauth API invoking associated interface according to the registration information;

a binding module, configured to bind the Oauth API invoking associated interface with the registered Oauth API, and generate binding information;

a use interface generating module, configured to receive an increasing Oauth API message, respond to the increasing Oauth API message, and generate a client requesting Oauth API interface, an Oauth API returned information processing interface and a client customer serial number managing interface, which correspond to the registered Oauth API;

a deploying module, configured to receive a publishing application message, respond to the publishing application message, and generate a deployment package which includes the client requesting Oauth API interface, the Oauth API returned information processing interface and the client customer serial number managing interface;

a sending module, configured to send the binding information and the deployment package to an application running engine, so that the application running engine complete Oauth API scheduling according to the binding information and the deployment package.

Still another aspect of the present invention also provides a method for invoking an Oauth API, the method includes:

intercepting a client request message, allocating a customer serial number for a client, and storing the customer serial number;

receiving an Oauth API invoking request carrying the customer serial number, where the Oauth API invoking request is sent by the client through invoking a client requesting Oauth API interface;

authenticating Oauth API invoking according to the customer serial number carried by the Oauth API invoking request, and obtaining interface binding information corresponding to an Oauth API which is requested to be invoked after the authentication is passed;

performing authorization and authentication according to the interface binding information, and obtaining an access token;

injecting the access token into the Oauth API invoking request, and sending the Oauth API invoking request into which the access token is injected to an Oauth API provider, so that the Oauth API responds to the Oauth API invoking request into which the access token is injected, and returns Oauth API returned information;

returning the Oauth API returned information to the client, so as to complete the Oauth API invoking.

A further aspect of the present invention also provides an application running engine, the application running engine includes:

a client customer serial number managing module, configured to intercept a client request message, allocate a customer serial number for a client, and store the customer serial number;

an Oauth API invoking request receiving module, configured to receive an Oauth API invoking request carrying the customer serial number, wherein the Oauth API invoking request is sent by the client through invoking a client requesting Oauth API interface;

an authenticating module, configured to authenticate Oauth API invoking according to the customer serial number carried by the Oauth API invoking request, and obtaining interface binding information corresponding to an Oauth API which is requested to be invoked after the authentication is passed;

an authorization and authentication module, configured to perform authorization and authentication according to the interface binding information, and obtain an access token;

an Oauth API invoking module, configured to inject the access token into the Oauth API invoking request, and send the Oauth API invoking request into which the access token is injected to an Oauth API provider, so that the Oauth API responds to the Oauth API invoking request into which the access token is injected, and returns Oauth API returned information;

an Oauth API returned information processing module, configured to return the Oauth API returned information to the client, so as to complete the Oauth API invoking.

A further aspect of the present invention also provides a system for using an Oauth API, the system includes an application developing platform according to embodiments of the present invention, and an application running engine according to embodiments of the present invention.

According to the method, device and system for using and invoking an Oauth API of the present invention, a set of universal authentication interfaces are formed through abstracting Oauth authentication logic, when developers develop applications, the application developing platform automatically generates executable interfaces and injects them into the application running engine, so that the application running engine can automatically execute these executable interfaces to complete Oauth API invoking when determining that the client needs the Oauth API invoking. It can be seen that, in the method for using the Oauth API according to the above embodiment, the developers only need to introduce the Oauth API registration into the application developing platform, that is, provide Oauth API registration information to the application developing platform, the remaining generating of the executable interfaces and related processing are all completed automatically by the application developing platform, thereby greatly simplifying the application development procedure, and improving development efficiency.

BRIEF DESCRIPTION OF DRAWINGS

To describe technical solutions in embodiments of the present invention or in the prior art more clearly, the following briefly describes the accompanying drawings required in the description of embodiments of the present invention or the prior art, apparently, the accompanying drawings illustrate only some exemplary embodiments of the present invention, and those skilled in the art can derive other drawings from these drawings without creative efforts.

DESCRIPTION OF EMBODIMENTS

The technical solutions in embodiments of the present invention are described clearly and comprehensively with reference to the accompanying drawings, obviously, the embodiments described are only some exemplary embodiments of the present invention, and the present invention is not limited to such embodiments. Other embodiments derived by those skilled in the art on the basis of the embodiments herein without any creative effort fall within the protection scope of the present invention.

Figure 1:
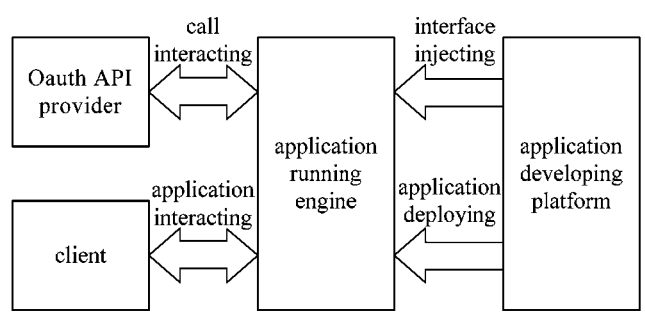
FIG. 1 is a system architecture diagram for applying a method for using an Oauth API according to an embodiment of the present invention.

FIG. 1 is a system architecture diagram for applying a method for using an Oauth API according to an embodiment of the present invention. As shown in FIG. 1, an Oauth API provider, a client, an application running engine and an application developing platform are included. Where the application developing platform is configured to automatically generate executable interfaces related to an Oauth API, and inject these executable interfaces into the application running engine, so that the application running engine utilize these executable interfaces to complete an Oauth API invoking request initiated by the client. The following describes the method for using the Oauth API according to the embodiment of the present invention in detail from the point of the application developing platform.

Figure 2:
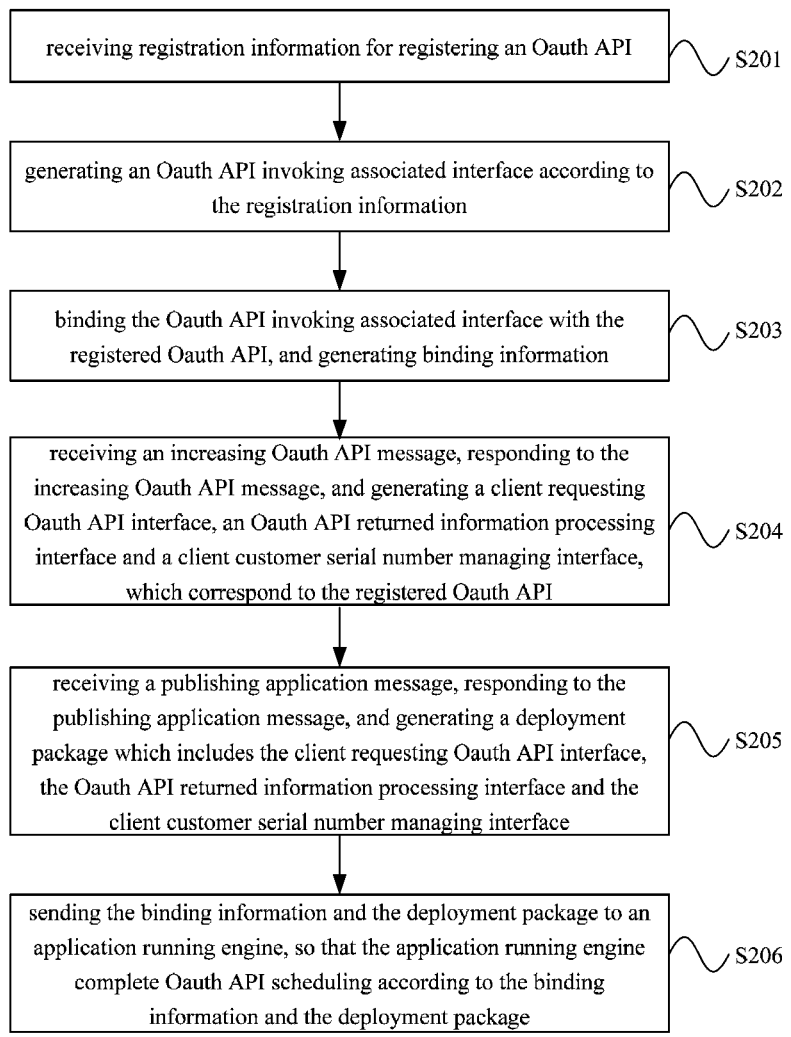
FIG. 2 is a flowchart of a method for using an Oauth API according to an embodiment of the present invention.

FIG. 2 is a flowchart of a method for using an Oauth API according to an embodiment of the present invention. As shown in FIG. 2, the method for using the Oauth API includes the following steps of:

Step S201, receiving registration information for registering an Oauth API;

Step S202, generating an Oauth API invoking associated interface according to the registration information;

Step S203, binding the Oauth API invoking associated interface with the registered Oauth API, and generating binding information;

Step S204, receiving an increasing Oauth API message, responding to the increasing Oauth API message, and generating a client requesting Oauth API interface, an Oauth API returned information processing interface and a client customer serial number managing interface, which correspond to the registered Oauth API;

Step S205, receiving a publishing application message, responding to the publishing application message, and generating a deployment package which includes the client requesting Oauth API interface, the Oauth API returned information processing interface and the client customer serial number managing interface;

Step S206, sending the binding information and the deployment package to an application running engine, so that the application running engine complete Oauth API scheduling according to the binding information and the deployment package.

Specifically, in the method for using the Oauth API according to the above embodiment, a developer registers the Oauth API in the application developing platform, and provides the registration information of the Oauth API, where the Oauth API is an available Oauth API provided by an Oauth API provider. The application developing platform automatically generates the Oauth API invoking associated interface according to the registration information for registering the Oauth API, where the Oauth API invoking associated interface is used for achieving the support for the Oauth API invoking. In addition, the increase of the Oauth API in the application developing platform can also be triggered according to the registered Oauth API.

According to the method for using the Oauth API of the above embodiment, a set of universal authentication interfaces are formed through abstracting Oauth authentication logic, when developers develop applications, the application developing platform automatically generates executable interfaces and injects them into the application running engine, so that the application running engine can automatically execute these executable interfaces to complete Oauth API invoking when determining that the client needs the Oauth API invoking. It can be seen that, in the method for using the Oauth API according to the above embodiment, the developers only need to introduce the Oauth API registration into the application developing platform, that is, provide Oauth API registration information to the application developing platform, the remaining generating of the executable interfaces and related processing are all completed automatically by the application developing platform, thereby greatly simplifying the application development procedure, and improving development efficiency.

Figure 3:
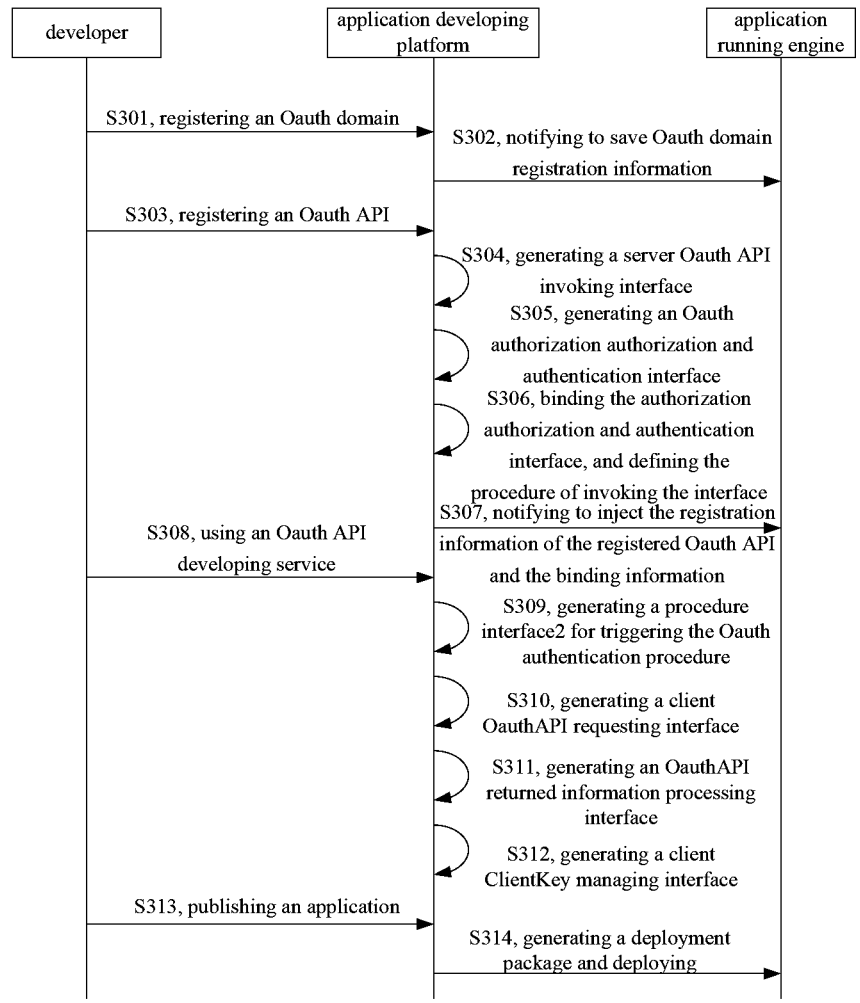
FIG. 3 is a flowchart of a method for using an Oauth API according to another embodiment of the present invention.

FIG. 3 is a flowchart of a method for using an Oauth API according to another embodiment of the present invention. As shown in FIG. 3, the following procedures are included:

Step S301, a developer registers an Oauth domain in an application developing platform;

Where, the information needs to be registered includes the following domain information which is needed when accessing an Oauth API:

a name (Name), which is used for identifying the name of the registered Oauth domain, such as sina;

a communication use protocol (Use SSL), the communication use protocol includes the hyper text transfer protocol (HyperText Transfer Protocol, HTTP) and the secure hyper text transfer protocol (Secure Hyper Text Transfer Protocol, HTTPS), one protocol of the two must be selected when registering, such as selecting the HTTP;

a request token (Request Token) uniform resource locator (Uniform/Universal Resource Locator, URL), which is used for identifying the service address provided by the Oauth API provider to the customer for obtaining the request token, such as "api.t.sina.com.cn/oauth/request token";

an authorization and authentication URL, which is used for identifying the official authentication address provided by the Oauth API provider for user authorization, such as "api.t.sina.com.cn/oauth/authorize";

an access token URL, which is used for identifying the address provided by the Oauth API provider to the customer for obtaining the access token and the access signature, such as "api.t.sina.com.cn/oauth/access_token";

an application serial number (consumer Key), which is used for identifying the application serial number needed for accessing a service, and provided by the Oauth API provider, such as "4018652807";

an application signature (consumer Secret), which is used for identifying the application signature needed for accessing a service, and provided by the Oauth API provider, such as "5ee8fc57a5c8a9589a3933b92576a0b6".

Step S302, after receiving the message for registering the Oauth domain, the application developing platform records the Oauth domain registration information, and notifies the application running engine to save the Oauth domain registration information;

Step S303, the developer registers the Oauth API in the application developing platform;

Where the registration information needs to be provided by the developer includes API information needed for invoking the Oauth API, which specifically includes the following information:

a name (Name), which is used for identifying the API name, such as "SinaUpdate";

a HTTP method (method), which is used for identifying the method for invoking the service, where the method for invoking the service includes two kinds: POST and GET, and only one of these two kinds needs to be selected when registering, such as "POST";

an URL, which is used for identifying the URL which API accesses, such as "http://api.t.sina.com.cn/statuses/update.json";

an input (Input) format, which is used for identifying the format of input data, such as urlencoded;

an output (Output) format, which is used for identifying the format of API returned data, where the format of the API returned data includes two kinds: json and xml, and only one of these two kinds is selected, such as "json";

an identifier of whether an authentication is needed (Need Oauth), YES or NO is selected, such as "YES";

a domain (Domain), which is used for associating a registered Oauth domain, such as "sina".

Step S304, after receiving the message for registering the Oauth API, the application developing platform generates a server Oauth API invoking interface;

Specifically, the application developing platform generates the interface for invoking the Oauth API in the application running engine according to the Oauth API registration information registered by the developer, this service OauthAPI invoking interface is the interface for sending request process to the Oauth API after the request signature information and the access token are injected after authentication succeeds. For example, the generating mode is: generating the interface by taking the name of the registered Oauth API as the name of the server Oauth API invoking interface, and taking "url", "httpmethod", "paramStr", "signature", "accessToken" as the interface parameter names. For example, the generated server Oauth API invoking interface is:

```
function InvokeSinaUpdate (url, method, paramStr, signature,
   accessToken)
{
   WebRMI.sendRealRESTRequest("http://api.t.sina.com.cn/statuses/
update.json", "POST", "id = test01", "setInfo");
}
```

Step S305, the application developing platform generates the Oauth authorization and authentication interface;

After receiving the message for generating the Oauth authorization and authentication interface, the application developing platform automatically generates the interface needed for the Oauth authorization and authentication. There are two modes of generating the interface, one is that generating an executable function interface, the other is that generating an interface docking with the SDK, which supports to bind an authorization and authentication interface generated dynamically and an OauthSDK interface deployed in the running engine.

The generated Oauth authorization and authentication interface includes, for example:

a signature interface, the generating mode is such as: taking the registered OauthAPI name and the keyword which means "signature" as the interface name, and taking "url", "key", "paras" as the parameter names to generate the signature interface. The generated signature interface is such as:

function SinaUpdateSign (baseURI, KEY)
{Return binb2str (core_sha1 (str2binb (baseURI, baseURI.length * KEY));} an obtaining request token interface, the generating mode is such as: taking the registered OauthAPI name and the keyword which means "RequestToken" as the interface name, and taking "consumerkey", "consumersecret", "requestTokenURL", "signature" as the parameter names to generate the interface. The generated obtaining request token interface is such as:

Function  GetSinaUpdateRequestToken  (consumerkey, consumersecret, requestTokenURL, sign)
    {...} a requesting user authorization interface, the generating mode is such as: taking the registered OauthAPI name and the keyword which means "user authorization" as the interface name, and taking "requestToken", "authoticationURL" as the parameter names to generate the interface. The generated requesting user authorization interface is such as:

function SinaUpdateUserAuthirity (requestToken, authoticationURL)
{..} an obtaining Oauth access token interface, the generating mode is such as: taking the registered OauthAPI name and the keyword which means "obtaining access token" as the interface name, and taking "requestToken", "AccessTokenURL", "Verifier" as the parameter names to generate the interface. The generated obtaining Oauth access token interface is such as:

function SinaUpdateGetAcceeToken (requestToken, AccessTokenURL, Verifier)
{...}

Step S306, the application developing platform binds the authorization and authentication interface according to the API name, and defines the procedure of invoking the interface.

Specifically, the bound interface may be an executable function interface and may also be an interface docking with the SDK. When the SDK interface is bound, the authorization and authentication interface needed for invoking the Oauth API and the authorization and authentication interface in the OauthSDK are bound and mapped. When defining the procedure of invoking the interface, for example, determining to bind the procedure of either "application automatically triggering Oauth authentication and authorization" or "user triggering Oauth authentication and authorization" according to the configuration information of the application developing platform, the various authorization procedure is bound according to the configuration information.

The binding information includes: the bound Oauth API name, the name of the interface for the server invoking the OauthAPI and the interface parameter names, the name of the interface corresponding to the signature and parameter names thereof, the name of the interface corresponding to obtaining the RequestToken and parameter names thereof, the name of the interface corresponding to triggering the user authorization and parameter names thereof, the name of the interface corresponding to obtaining the AccessToken and parameter names thereof, and the bound interface execution sequence.

The format of binding the interface is such as:

```
<API>
    <name> ApiName </ name>
    <interfaces>
    <invokeInfterFace>
    <! [CDATA [InvokeAPIName {...}]]  //when binding the
OauthSDK  interface, correspond to the specific interface in the
OauthSDK
    <invokeInfterFace />
    <OauthProccess>
    <type>
    <! [Auto]]
    </ Type>
    <Signature>
    <! [CDATA [ApiNameSign {...}]] //when binding the OauthSDK
interface, correspond to the specific interface in the OauthSDK
    </ Signature>
    <RequestToken>
    <! [CDATA [GetApiNameRequestToken {...}]] //when binding the
OauthSDK interface, correspond to the specific interface in the OauthSDK
    </ RequestToken>
    <UserAuthirity>
    <! [CDATA [ApiNameUserAuthority {...}]] //when binding the
OauthSDK interface, correspond to the specific interface in the OauthSDK
    </ UserAuthirity>
    <AccessToken>
    <! [CDATA [GetApiNameAccessToken {...}]] //when binding the
OauthSDK interface, correspond to the specific interface in the OauthSDK
    </ AccessToken>
    </ OauthProccess>
    </ Interfaces>
    </ API>
```

Step S307, the application developing platform notifies the application running engine to inject the registration information of the registered Oauth API and the binding information;

Step S308, the developer uses Oauth API developing service, and triggers the application developing platform to increase the Oauth API;

Step S309, after receiving the message for increasing the Oauth API, the application developing platform generates an interface for triggering the Oauth authentication procedure.

Specifically, if the application developing platform determines that the Oauth authorization and authentication procedure is "user triggering Oauth authorization and authentication procedure" according to the configuration information, then the generated interface information includes: 1. user triggering authentication and authorizing entrance (button/link) 2. the interface for requesting the Oauth authentication and authorization from the server after the user triggers the authorization and authentication procedure, "OauthAPI requesting authorization interface", where the "OauthAPI requesting authorization interface" includes parameters "OauthAPI name" and "customer serial number (ClientKey)".

Step S310, the application developing platform generates "client OauthAPI requesting interface";

Specifically, the generated client OauthAPI requesting interface is used when the application is running, the client requests the application running engine, by invoking this client OauthAPI requesting interface, to call the OauthAPI. The generating mode of the client OauthAPI requesting interface is such as: taking the registered OauthAPI name and the keyword which means "invoke" as the interface name, and taking "apiName", "clientKey", "paras", "injectedInterfaceName" as the parameter names to generate the interface. The generated client OauthAPI requesting interface is such as:

```
function invokeSinaUpdate (apiName, clientKey, paras, callback)
{...}
```

Step S311, the application developing platform generates "OauthAPI returned information processing interface";

Specifically, the generated OauthAPI return information processing interface is used for processing the information returned by the OauthAPI after the application running engine invokes the OauthAPI successfully. The generating mode of the OauthAPI returned information processing interface is such as: taking the registered OauthAPI name and the keyword which means "inject" as the interface name, and taking "result" as the parameter name to generate the interface definition information. The generated OauthAPI returned information processing interface is such as:

function sinaUpdateInjected (result) { . . . }

Step S312, the application developing platform generates "client ClientKey managing interface";

Specifically, the generated client ClientKey managing interface is used for saving the ClientKey of the legal access identifier allocated by the application running engine for the client. The generating mode of the client ClientKey managing interface is such as: taking the keyword which means "client key" as the interface name, taking the keyword which means "save client key" as the name to generate a functional method, and its parameter name is "url", and taking the keyword which means "getClientKeyKey" as the name to generate a non-parametric functional method, so as to generate the interface. The generated client ClientKey managing interface is such as:

```
function ClientKey
{
saveClientKey (url) {...};
getClientKeyKey ( ) {...};
}
```

Step S313, the developer publishes an application;

Step S314, the application developing platform generates a deployment package and deploys.

Specifically, after receiving the message for publishing the application which is sent by the developer, the application developing platform generates the deployment package according to the application information and notifies the application running engine to deploy.

Figure 4:
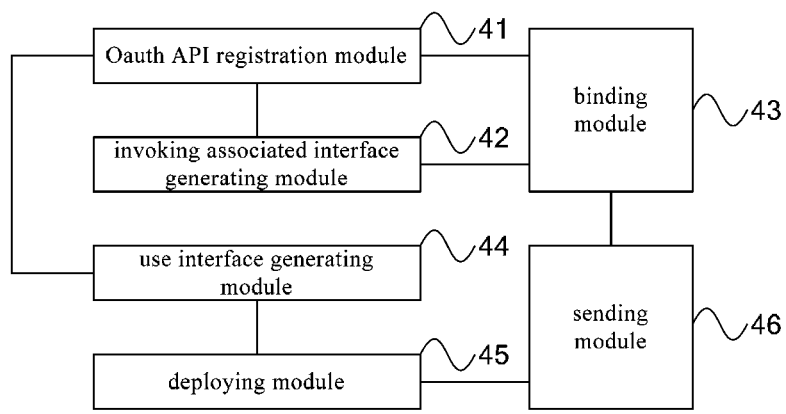
FIG. 4 is a schematic structural diagram of an application developing platform according to an embodiment of the present invention.

FIG. 4 is a schematic structural diagram of an application developing platform according to an embodiment of the present invention. As shown in FIG. 4, the application developing platform includes:

an Oauth API registration module 41, configured to receive registration information for registering an Oauth API;

an invoking associated interface generating module 42, configured to generate an Oauth API invoking associated interface according to the registration information;

a binding module 43, configured to bind the Oauth API invoking associated interface with the registered Oauth API, and generate binding information;

a use interface generating module 44, configured to receive an increasing Oauth API message, respond to the increasing Oauth API message, and generate a client requesting Oauth API interface, an Oauth API returned information processing interface and a client customer serial number managing interface, which correspond to the registered Oauth API;

a deploying module 45, configured to receive a publishing application message, respond to the publishing application message, and generate a deployment package which includes the client requesting Oauth API interface, the Oauth API returned information processing interface and the client customer serial number managing interface;

a sending module 46, configured to send the binding information and the deployment package to an application running engine, so that the application running engine complete Oauth API scheduling according to the binding information and the deployment package.

Where the use interface generating module 44 includes, for example, a client requesting Oauth API interface generating unit, an Oauth API returned information processing interface generating unit and a client customer serial number managing interface generating unit.

The procedure of the application development which is performed by the application developing platform of the above embodiment using the Oauth API is the same as the method for using the Oauth API according to the aforementioned embodiments, which will not be repeated here.

According to the application developing platform of the above embodiment, a set of universal authentication interfaces are formed through abstracting Oauth authentication logic, when developers develop applications, the application developing platform automatically generates executable interfaces and injects them into the application running engine, so that the application running engine can automatically execute these executable interfaces to complete Oauth API invoking when determining that the client needs the Oauth API invoking. It can be seen that, in the method for using the Oauth API according to the above embodiment, the developers only need to introduce the Oauth API registration into the application developing platform, that is, provide Oauth API registration information to the application developing platform, the remaining generating of the executable interfaces and related processing are all completed automatically by the application developing platform, thereby greatly simplifying the application development procedure, and improving development efficiency.

Further, in the application developing platform of the above embodiment, the registration token includes: the name of the registered Oauth API, a request method, a uniform resource locator, an input format, an output format, an identification indicating whether open authorization protocol Oauth authentication needs to be opened, and the domain name of the Oauth domain corresponding to the registered Oauth API.

Further, the application developing platform of the above embodiment also includes:

an Oauth domain registering module, configured to receive registration information for registering an Oauth domain, where the registered Oauth domain corresponds to the registered Oauth API.

Further, in the application developing platform of the above embodiment, the call associated interface generating module includes:

a server Oauth API invoking associated interface generating unit, configured to generate a server Oauth API invoking interface;

an Oauth authorization and authentication interface generating unit, configured to generate an authorization and authentication interface.

Further, in the application developing platform of the above embodiment, the binding information includes the name of the registered Oauth API, the server Oauth API invoking interface, the authorization and authentication interface, and an interface executing procedure.

The method for invoking an Oauth API according to embodiments of the present invention may also be implemented based on the system architecture shown in FIG. 1, where the method for invoking the Oauth API is performed by the application running engine shown in FIG. 1, the following describes the method for invoking the Oauth API according to embodiments of the present invention in detail from the point of the application running engine.

Figure 5:
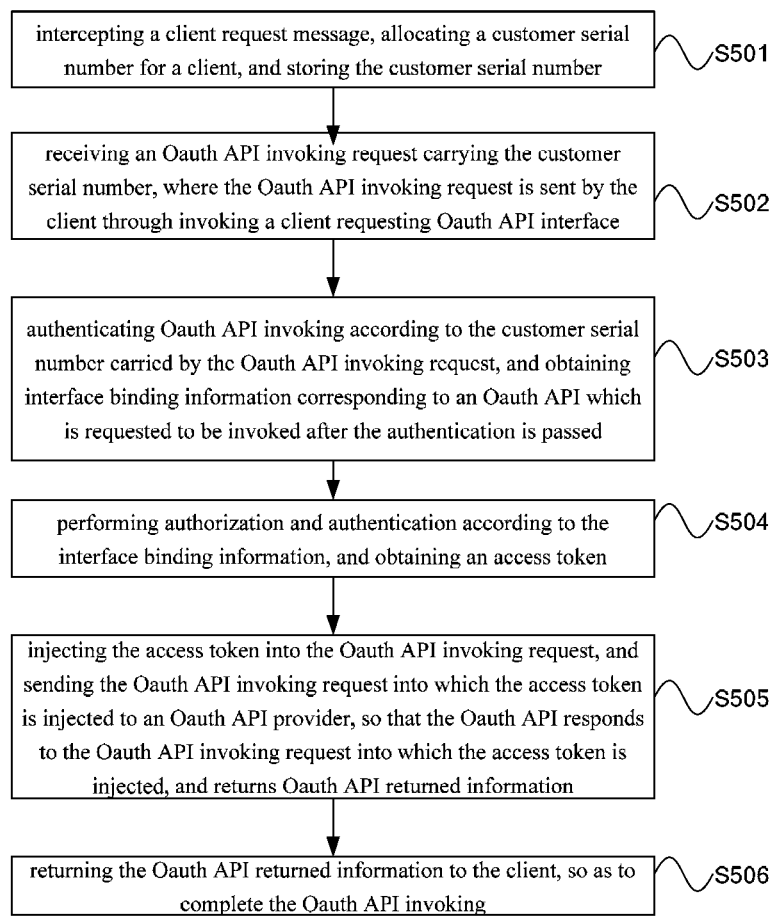
FIG. 5 is a flowchart of a method for invoking an Oauth API according to an embodiment of the present invention.

FIG. 5 is a flowchart of a method for invoking an Oauth API according to an embodiment of the present invention. As shown in FIG. 5, the method for invoking the Oauth API includes the following steps:

Step S501, intercepting a client request message, allocating a customer serial number for a client, and storing the customer serial number;

Step S502, receiving an Oauth API invoking request carrying the customer serial number, where the Oauth API invoking request is sent by the client through invoking a client requesting Oauth API interface;

Step S503, authenticating Oauth API invoking according to the customer serial number carried by the Oauth API invoking request, and obtaining interface binding information corresponding to an Oauth API which is requested to be invoked after the authentication is passed;

Step S504, performing authorization and authentication according to the interface binding information, and obtaining an access token;

Step S505, injecting the access token into the Oauth API invoking request, and sending the Oauth API invoking request into which the access token is injected to an Oauth API provider, so that the Oauth API responds to the Oauth API invoking request into which the access token is injected, and returns Oauth API returned information;

Step S506, returning the Oauth API returned information to the client, so as to complete the Oauth API invoking.

In the method for invoking the Oauth API according to the above embodiment, the interface binding information and all executable interfaces which are involved during the Oauth API invoking process executed by the application running engine responding to the client request, are pre-generated by the application developing platform, the specific generating process is the same as that in the method for using the Oauth API according to the aforementioned embodiments, which will not be repeated here.

According to the method for invoking the Oauth API of the above embodiment, since the application running engine automatically uses the executable interfaces provided by the application developing platform to complete the Oauth API invoking, a convenient Oauth API invoking is achieved.

Further, in the Oauth API calling method according to the above embodiment, the trigger of the authorization authentication includes two cases, that is, the application automatically triggers the Oauth authorization authentication and the user triggers the Oauth authorization authentication. The following describes these two cases respectively.

Figure 6:
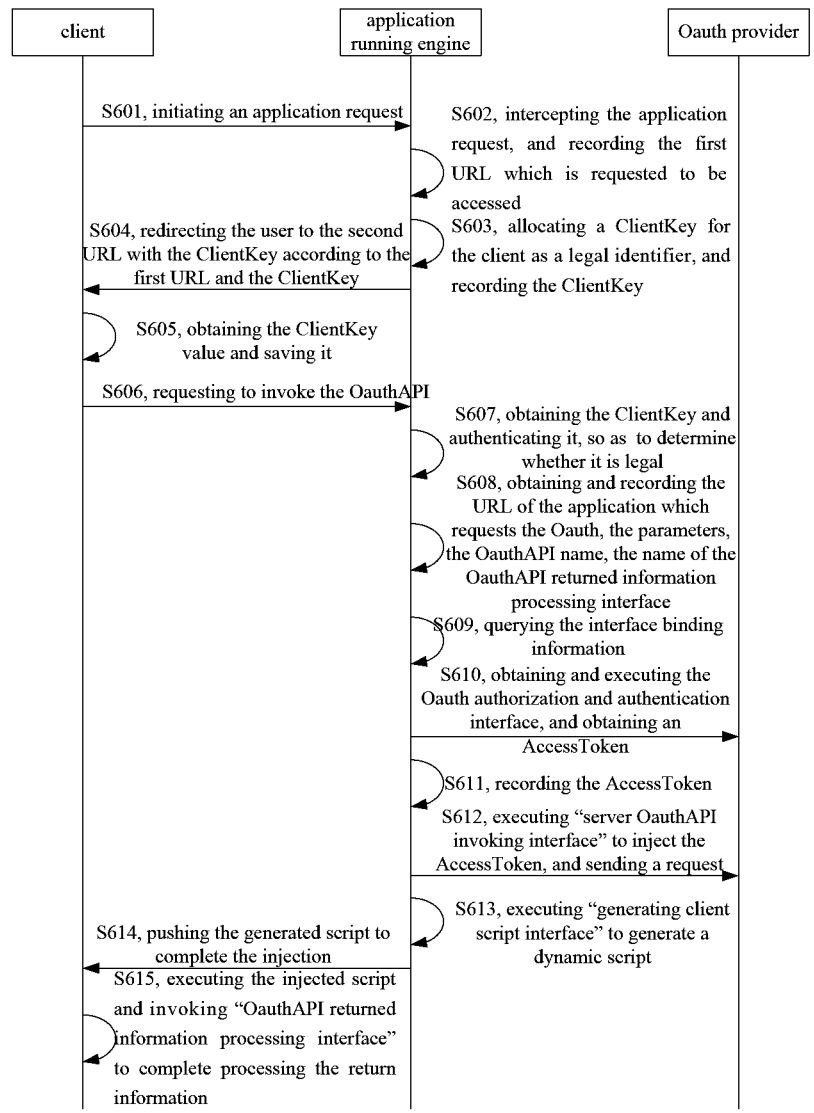
FIG. 6 is a flowchart of a method for invoking an Oauth API according to another embodiment of the present invention.

FIG. 6 is a flowchart of a method for invoking an Oauth API according to another embodiment of the present invention. As shown in FIG. 6, when an application automatically triggers Oauth authorization and authentication, the method for invoking the Oauth API includes the following procedures:

Step S601, a user accesses an application deployed in the application running engine via a client tool, and initiates an application request;

Step S602, intercepting the application request sent by the client, and recording the first URL which is requested to be accessed;

Step S603, allocating a unique identified customer serial number (ClientKey) for the client, and recording the ClientKey;

Where, the rule of generating the ClientKey value is: according to the client IP, the current SessionID, the application name, the user ID, the GUID and the current request time, signing by HMAC-SHA1 algorithm to generate.

Step S604, according to the URL recorded in the step S602 and the ClientKey generated in the step S603, redirecting the user to the second URL with the ClientKey;

Where the example of the second URL format is as follows:

http://hostname/
    appname?ClientKey=ssdfd44541232322sdd

Step S605, when the application is running on the client, invoking "ClientKey managing Interface" to obtain the ClientKey value and save it;

Step S606, the client requests the application running engine to invoke the OauthAPI, where the request parameters include the ClientKey recorded in the step S605, the name of the invoked OauthAPI, the parameters needed for invoking the OuathAPI, and the name of the interface for the client processing the returned result.

Step S607, the application running engine obtains the ClientKey and authenticates it, so as to determine whether it is a legal ClientKey, an authenticating method is such as:

1) checking whether the ClientKey provided by the client is recorded in the application running engine, being illegal if not.

2) anti-signing the ClientKey to obtain each item of corresponding information in the CientKey.

3) obtaining the client IP, the current SessionID, the request application name, the user ID according to the client request.

4) matching each item of the information obtained upon 2) and the information obtained upon 3), being legal if the two match, being illegal if not.

Step S608, according to the request information, obtaining and recording the URL of the application which requests the Oauth, the parameters, the OauthAPI name, the name of the OauthAPI returned information processing interface;

Step S609, querying the corresponding interface binding information according to the requested OauthAPI name, the interface binding information is the binding information generated in the procedure of the application developing platform using the OauthAPI;

Step S610, obtaining and executing the Oauth authorization and authentication interface according to the interface binding information obtained in the step S609, and obtaining an AccessToken;

Specifically, the obtaining the AccessToken specifically includes:

1) obtaining the authorization and authentication interface according to the interface binding information, and executing the authorization and authentication interface;

2) when triggering the user authorization interface to redirect to the Oauth provider authorization page is executed, setting CALLBACK of the Oauth provider as the URL for the application running engine receiving the certificating result service;

3) obtaining an authenticator by receiving the authentication result service, and obtaining the access token;

4) combining the customer serial number and the identifier of the Oauth API as an identifier for recording the access token according to the stored customer serial number, the identifier of the Oauth API and the access token, and recording the access token.

Step S611, re-performing the signing by HMAC-SHA1 algorithm to the ClientKey and OauthAPI according to the earlier recorded ClientKey, the OauthAPI name, and the obtained AcceessToken, and recording the AccessToken by taking the generated signature value as an identifier of recording the AcceessToken.

Step S612, executing "server OauthAPI invoking interface" to inject the AccessToken according to the earlier recorded parameters and the AccessToken, and sending a request to the OauthAPI;

Step S613, executing "generating client script interface" to generate a dynamic script according to the obtained OauthAPI returned information and the interface name of the recorded injecting result;

Generating the dynamic script is such as:

```
{
response.setContentType ("script");
    out = interfaceCallBack + "(" + data ")";
response.println (out);
}
```

Step S614, pushing the generated script to the client to complete injecting the script to the client.

Step S615, the client executes the injected script and invokes "OauthAPI returned information processing interface" to complete processing the returned information, such as displaying and calculating result information.

Figure 7:
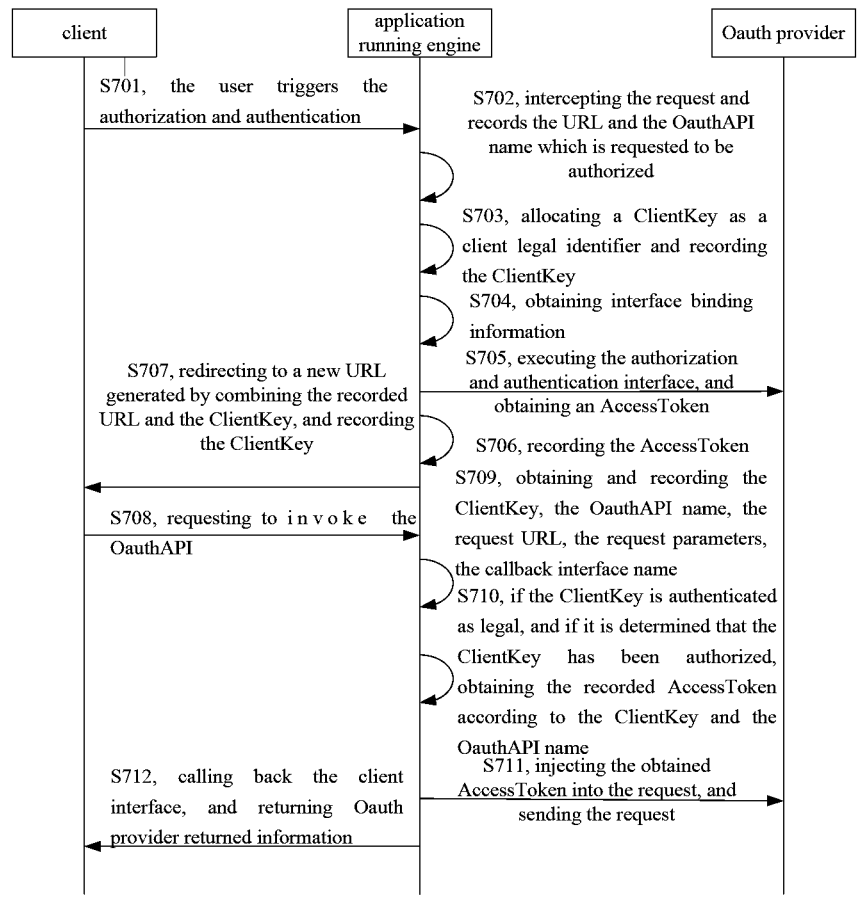
FIG. 7 is a flowchart of a method for invoking an Oauth API according to still another embodiment of the present invention.

FIG. 7 is a flowchart of a method for invoking an Oauth API according to still another embodiment of the present invention. As shown in FIG. 7, when a user triggers Oauth authorization and authentication, the method for invoking the Oauth API includes the following procedures:

Step S701, after receiving a message for invoking an OauthAPI, the "client OauthAPI requesting interface" opens the "client triggering Oauth authentication procedure interface", prompting the user to trigger the authorization and authentication procedure; after the user triggers the certificating authorization procedure, requesting the application running engine to perform the Oauth authorization; the content of the message for invoking the OauthAPI received by the "client requesting OauthAPI Interface" includes: the OauthAPI name, the service interface URL turned to after the authorization succeeds, the corresponding parameter values when invoking the OauthAPI;

Step S702, after receiving the authorization request, the application running engine intercepts the request and records the URL and the OauthAPI name which is requested to be authorized;

Step S703, the application running engine allocates a unique identifier ClientKey as a client legal identifier and records the ClientKey;

Step S704, obtaining interface binding information of the requested OauthAPI according to the requested OauthAPI name;

Step S705, executing the authorization and authentication interface according to the binding information, and obtaining an AccessToken;

Step S706, recording the AccessToken according to the ClientKey and the OauthAPI name;

Step S707, redirecting the user to a new URL generated by combining the recorded URL and the ClientKey, the client obtains and records the ClientKey;

The new URL is such as: http://huawei.com?ClientKey=ssdfj123232323.

Step S708, the client requests, according to the ClientKey, the application running engine to invoke the OauthAPI;

Step S709, obtaining and recording the ClientKey, the OauthAPI name, the request URL, the request parameters, the callback interface name;

Step S710, if the ClientKey is authenticated as legal, and if it is determined that the ClientKey has been authorized, obtaining the recorded AccessToken according to the ClientKey and the OauthAPI name; if the ClientKey is authenticated as illegal, returning ClientKey invalid information, and if it is determined that the ClientKey has not been authorized, going back to the step S702 to re-authorize the ClientKey;

Step S711, injecting the obtained AccessToken into the request, and sending the request to the Oauth provider;

Step S712, calling back the client interface, and returning Oauth provider returned information.

In the method for invoking the OauthAPI according to the above embodiment, one-to-one mode is formed through executing authorization authentication at the server in a concentrated mode, thereby many-to-one mode by which the application client and the Oauth provider interact directly with each other is avoided, interaction endpoints are reduced, and the risk of sensitive data being transmitted on the Internet can be reduced.

Further, in the method for invoking the OauthAPI according to the above embodiment, performing the authorization and authentication according to the interface binding information specifically includes:

obtaining the authorization and authentication interface from the interface binding information, and running the authorization and authentication interface to complete the authorization and authentication; or obtaining the interface mapping information corresponding to the interface in the Oauth SDK from the interface binding information, invoking the specific interface in the Oauth SDK through the mapped interface name and the mapped parameter name to complete the authentication and authorization.

According to the method for invoking the Oauth API of the above embodiment, Oauth API authentication procedure interface is invoked and executed by adopting a common manner, thereby avoiding introducing SDK of different providers when using the Oauth API provided by different Oauth providers will cause space to be wasted.

Figure 8:
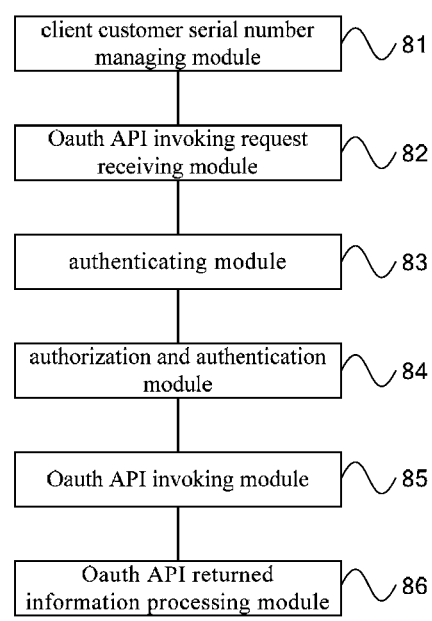
FIG. 8 is a schematic structural diagram of an application running engine according to an embodiment of the present invention.

FIG. 8 is a schematic structural diagram of an application running engine according to an embodiment of the present invention. As shown in FIG. 8, the application running engine includes:

a client customer serial number managing module 81, configured to intercept a client request message, allocate a customer serial number for a client, and store the customer serial number;

an Oauth API invoking request receiving module 82, configured to receive an Oauth API invoking request carrying the customer serial number, wherein the Oauth API invoking request is sent by the client through invoking a client requesting Oauth API interface;

an authenticating module 83, configured to authenticate Oauth API invoking according to the customer serial number carried by the Oauth API invoking request, and obtaining interface binding information corresponding to an Oauth API which is requested to be invoked after the authentication is passed;

an authorization and authentication module 84, configured to perform authorization and authentication according to the interface binding information, and obtain an access token;

an Oauth API invoking module 85, configured to inject the access token into the Oauth API invoking request, and send the Oauth API invoking request into which the access token is injected to an Oauth API provider, so that the Oauth API responds to the Oauth API invoking request into which the access token is injected, and returns Oauth API returned information;

an Oauth API returned information processing module 86, configured to return the Oauth API returned information to the client, so as to complete the Oauth API invoking.

The specific procedure of executing the Oauth API invoking by the application running engine according to the above embodiment is the same as the method for invoking the Oauth API according to the above embodiments, which will not be repeated here.

According to the application running engine of the above embodiment, a convenient Oauth API invoking is achieved through automatically using the executable interfaces provided by the application developing platform to complete the Oauth API invoking.

Further, in the application running engine according to the above embodiment, the client request message includes the URL that the client requests to access.

Further, in the application running engine according to the above embodiment, the client request message comprises an identifier of an Oauth API which the client requests to invoke, a service page URL turned to after the authorization succeeds, and corresponding parameter values for invoking the Oauth API.

Further, in the application running engine according to the above embodiment, the authorization and authentication module specifically includes:

a first processing unit, configured to obtain the authorization and authentication interface according to the interface binding information, and execute the authorization and authentication interface;

a second processing unit, configured to, when triggering the user authorization interface to redirect to the Oauth provider authorization page is executed, set CALLBACK of the Oauth provider as the URL for the application running engine receiving the authentication result service;

a third processing unit, configured to obtain an authenticator by receiving the authentication result service, and obtain an access token;

a fourth processing unit, configured to, according to the stored clientkey, the Oauth API identifier and the access token, combine the customer serial number and the identifier of the Oauth API as an identifier for recording the access token according to the stored customer serial number, the identifier of the Oauth API and the access token, and recording the access token.

Embodiments of the present invention also provide a system for using an Oauth API, the system includes an application developing platform according to any one of the above embodiments, and an application running engine according to any one of the above embodiments.

According to the system for using the Oauth API of the above embodiment, a set of universal authentication interfaces are formed through abstracting Oauth authentication logic, when developers develop applications, the application developing platform automatically generates executable interfaces and injects them into the application running engine, so that the application running engine can automatically execute these executable interfaces to complete Oauth API invoking when determining that the client needs the Oauth API invoking. It can be seen that, in the method for using the Oauth API according to the above embodiment, the developers only need to introduce the Oauth API registration into the application developing platform, that is, provide Oauth API registration information to the application developing platform, the remaining generating of the executable interfaces and related processing are all completed automatically by the application developing platform, thereby greatly simplifying the application development procedure, and improving development efficiency.

Finally, it should be noted that the above embodiments are merely provided for describing the technical solutions of the present invention, but not intended to limit the present invention; It should be understood by those skilled in the art that although the present invention has been described in detail with reference to the foregoing embodiments, modifications can be made to the technical solutions described in the foregoing embodiments, or equivalent replacements can be made to some technical features in the technical solutions; however such modifications or replacements do not cause the essence of corresponding technical solutions to depart from the spirit and the scope of the present invention.

What is claimed is:

1. A method for invoking an Oauth API, which is performed by an application running engine, comprising:

intercepting, by the application running engine, an application request message from a client, allocating, by the application running engine, a customer serial number according to a current session identifier, and storing, by the application running engine, the customer serial number;

receiving, by the application running engine, an Oauth API invoking request carrying the customer serial number, wherein the Oauth API invoking request is sent by the client through invoking a client requesting Oauth API interface;

authenticating, by the application running engine, the Oauth API invoking request according to the customer serial number;

obtaining, by the application running engine, interface binding information corresponding to an Oauth API which is requested to be invoked after the authentication is passed;

performing, by the application running engine, authorization and authentication according to the interface binding information, and obtaining, by the application running engine, an access token form an Oauth provider;

injecting, by the application running engine, the access token into the Oauth API invoking request, and sending, by the application running engine, the injected Oauth API invoking request to the Oauth provider, so that the Oauth provider responds to the injected Oauth API invoking request, and returns Oauth API returned information; and returning, by the application running engine, the Oauth API returned information to the client, so as to complete the Oauth API invoking;

wherein the performing the authorization and authentication according to the interface binding information comprises: obtaining an authorization and authentication interface from the interface binding information, and running the authorization and authentication interface to complete authorization and authentication; or obtaining interface mapping information corresponding to an interface in Oauth SDK from the interface binding information, invoking a specific interface in the Oauth SDK via a mapped interface name and a mapped parameter name to complete authentication and authorization.

2. The method for invoking the Oauth API according to claim 1, wherein the client request message comprises a URL which the client requests to access.

3. The method for invoking the Oauth API according to claim 1, wherein the client request message comprises an identifier of an Oauth API which the client requests to invoke, a service page URL turned to after the authorization succeeds, and corresponding parameter values for invoking the Oauth API.

4. The method for invoking the Oauth API according to claim 1, wherein the performing the authorization and authentication according to the interface binding information, and obtaining the access token specifically comprises:

obtaining an authorization and authentication interface according to the interface binding information, and executing the authorization and authentication interface;

when triggering a user authorization interface to redirect to an Oauth provider authorization page is executed, setting CALLBACK of the Oauth provider as a URL for an application running engine receiving an authentication result service;

obtaining an authenticator by presenting the authentication result service, and obtaining an access token;

combining the customer serial number and the identifier of the Oauth API as an identifier for recording the access token according to the stored customer serial number, the identifier of the Oauth API and the access token, and recording the access token.

5. The method for invoking the Oauth API according to claim 1, wherein the authenticating the Oauth API invoking request according to the customer serial number carried by the Oauth API invoking request specifically comprises:

determining whether the customer serial number carried by the Oauth API invoking request is recorded, if not, the authentication fails;

if yes, decrypting the customer serial number, obtaining plaintext information corresponding to the customer serial number, and obtaining, according to the client request, a client internet protocol (IP) address, the current session ID, a requested application name, and a user identifier;

matching corresponding items of the plaintext information and the information obtained upon the client request, if the corresponding items are matched, the authentication is passed, if the corresponding items are not matched, the authentication fails.

6. The method for invoking the Oauth API according to claim 1, wherein the returning the Oauth API returned information to the client specifically comprises:

generating a script according to the Oauth API returned information and pushing the script to inject into the client; or returning the Oauth API returned information to the client through calling back the client interface.

7. The method for invoking the Oauth API according to claim 1, wherein the interface binding information and the authorization and authentication interface are pre-generated and sent from the application developing platform comprising:

the application developing platform receiving registration information for registering an Oauth API;

generating the authorization and authentication interface according to the registration information;

binding the authorization and authentication interface with the registered Oauth API, and generating the interface binding information;

sending the interface binding information to the application running engine.

8. The method for invoking the Oauth API according to claim 7, wherein the registration information comprises: a name of the registered Oauth API, a request method, a uniform resource locator, an input format, an output format, an identification indicating whether authorization protocol Oauth authentication needs to be opened, and a domain name of an Oauth domain corresponding to the registered Oauth API.

* * * * *